Patented Mar. 31, 1942

2,277,973

UNITED STATES PATENT OFFICE 2,277,973

PROCESS OF PRODUCING ELECTRODE PASTES

Anna P. Hauel, Lancaster, N. Y.

No Drawing. Application September 16, 1940, Serial No. 356,979

5 Claims. (Cl. 136—27)

My present invention relates to the manufacture of positive and negative electrodes for lead acid storage batteries, and more particularly to the production of pastes for such electrodes.

Usually such pastes are made up of lead oxide or lead powder, e. g., black oxide, by mixing this material with water and sulphuric acid.

A series of difficulties arises when lead powder, e. g. black oxide or other lead oxides, are mixed in the usual manner with water and diluted sulphuric acid: the lead compound water-acid mixture becomes very hot, the setting of the paste ensues very quickly, the water evaporates, and the paste becomes so hard that it is often not soft and plastic enough to be pasted into the grid. The paste tends to set already and to get hard in the mixer, instead of in the grids.

These difficulties and disadvantages become especially evident if "heavy" pastes, i. e. pastes having a great specific weight, are to be produced. Such pastes are desirable if a large quantity of active lead should be brought into the grid. In this case the tendency of the lead compound to get hot, and to become hard before being pasted into the grid, is especially great.

I have found the cause of these disadvantages in the fact that during or after the mixing of the lead compounds with water or diluted sulphuric acid, the lead compounds contact with air: the reaction between the air oxygen and the metallic lead particles or certain lower lead oxides is causing quick oxidation. Although the formation of lead oxides is not a disadvantage per se, this quick oxidation is one of the reasons why the mixture becomes hot and hardens prematurely.

In order to avoid the disadvantages of the known methods as set forth above, i. e., in order to prevent the lead compound-water or -acid mixture to become hot and to harden before being pasted into the grids, I propose, in accordance with my present invention, to add to said mixture small amounts of a substance being adapted to retard or to prevent reaction between wet metallic lead particles or lower lead oxides and air oxygen, and to retard or prevent thereby oxidation of the same.

Besides avoiding the disadvantages of the known producing methods, my new process has the advantage of allowing the addition of a relatively great amount of sulphuric acid, when desired, without reducing the specific weight of the pastes produced. This is practically impossible without the addition proposed by me: if a very small quantity of water and a great amount of sulphuric acid, i. e., a concentrated acid solution is used, the paste may actually become heavy, but it will turn out as hard as stone. If one tries to add more water in order to make it softer and more plastic, the specific weight of the paste, and therewith the percentage of lead, will be reduced. By adding the reducing agent in accordance with my invention, I have the possibility to add a great amount of concentrated sulphuric acid without the paste becoming hard.

Still a further advantage of my process consists in the fact that pastes made in accordance with my present invention shrink much less during the drying than pastes made up in the usual way. This means that the paste pellets are not getting detached from the wires of the grid after drying.

Furthermore, a paste made up with the addition proposed by me is getting much harder after drying than pastes of the usual type.

In accordance with a preferred embodiment of my invention I propose in a process of producing pastes for positive and negative electrodes, which process comprises treating a mixture containing metallic lead particles covered by oxide films with water, and sulphuric acid, the step of adding, before hardening of said mixture, a small amount, preferably from 0.01 to 0.2 per cent by weight, of pyrogallol.

As set forth above, the amount of the substance added in accordance with my present invention ranges from 0.01 to 0.2, preferably 0.05 to 0.1, per cent by weight; it is thus clear that the action of the added substance can be a catalytic one only.

My new process is carried out by first mixing the lead compounds used, i. e., the lead powder or black lead or lead oxides with the reducing agent, being adapted to retard or to prevent reaction between wet metallic lead particles or lower oxides, and air oxygen, thereafter treat this mixture with water, add sulphuric acid as usual, and form pastes from the thus treated lead compound for the manufacture of electrodes.

I have found it of advantage to add besides the above substance also at least one other reducing agent adapted to create by a catalytic process a very strong reaction between water and the lead compounds used as described in my U. S. Patent No. 2,202,489; I have found this addition to be especially advantageous if I use black oxide as initial material.

In accordance with another embodiment of my invention the lead oxides and lead powder used as initial material are allowed to stand in water for several hours, and pyrogallol is added to the thus treated lead oxides and lead compounds; small amounts of at least one reducing agent adapted to create by a catalytic process a very strong reaction between water and the lead oxides and compounds treated, may be added to the lead oxides or lead powder before the water treatment; sulphuric acid may be added to the thus treated lead oxide or compound mixture; thereafter the excess water is removed by pressing or by centrifuging the mixture until a suitable paste remains. This paste stays plastic and soft for a long time and can be filled into grids without becoming hot and hard.

The additional substance, preferably used by me for carrying out the present invention, is pyrogallol, because it is inexpensive, easy to use, and has a strong oxidation-retarding effect.

I want, furthermore, to stress that my present invention covers not only lead compounds, originally containing metallic lead particles; if lead oxides, containing no metallic particles, are used they sometimes seem to react during the mixing with water in a way that some free metallic lead atoms are formed. These free metallic lead atoms seem to react with the air oxygen in the same way as metallic lead particles being originally present in the initial material. Therefore, the addition of my new reducing agent to certain lead oxides has substantially the same effect as if added to lead powder, e. g., black oxide containing metallic lead particles.

I have furthermore found that litharge and red lead, too, are kept plastic and soft if, in accordance with my present invention, pyrogallol are added, although in this case, oxidation of metallic lead particles contained in these substances seems improbable. However, the catalytic process caused by addition of my new additional substance has the effect to keep lead oxides of this type plastic and soft, although they do not contain any, or only very small amount of metallic lead particles.

While I have described my new invention as embodied in electrode pastes, I do not intend to be limited to the details described, since various modifications and changes may be made without departing in any way from the spirit of my invention.

What I claim as new and desire to secure by Letters Patent is:

1. In a process of producing pastes for electrodes of lead acid storage batteries which comprises treating a mixture containing at least one substance selected from the group consisting of lead oxides and lead powder, with water, the step of adding to said mixture a small amount of pyrogallol, keeping the paste plastic and soft.

2. In a process of producing pastes for electrodes of lead acid storage batteries which comprises treating a mixture containing at least one substance selected from the group consisting of lead oxides and lead powder, with water, the step of adding to said mixture from 0.01 to 0.2 per cent by weight of pyrogallol.

3. In a process of producing pastes for electrodes of lead acid storage batteries which comprises treating black oxide with water, the step of mixing with said black oxide a small amount of pyrogallol, being adapted to retard reaction between wet metallic lead particles and air oxygen, thereby keeping the paste plastic and soft.

4. In a process of producing pastes for electrodes of lead acid storage batteries which comprises treating black oxide with water, the step of mixing before hardening of the paste with said black oxide from 0.01 to 0.2 per cent by weight of pyrogallol.

5. Process of producing pastes for electrodes of lead acid storage batteries comprising the step of mixing black oxide with from 0.01 to 0.2 per cent by weight of pyrogallol, adding a small amount of at least one reducing agent adapted to create by a catalytic process a very strong reaction between water and said black oxide, treating said mixture with water in excess for several hours, adding sulphuric acid, and forming pastes from the thus treated black oxide for the manufacture of electrodes.

ANNA P. HAUEL.